SWITCHING SYSTEM UTILIZING FLUID LOGIC DEVICE

Filed Aug. 10, 1967 7 Sheets-Sheet 1

INVENTOR
D. J. THOMSON
BY Leo Stanger
ATTORNEY

SWITCHING SYSTEM UTILIZING FLUID LOGIC DEVICE

Filed Aug. 10, 1967 7 Sheets-Sheet 3

SWITCHING SYSTEM UTILIZING FLUID LOGIC DEVICE

SWITCHING SYSTEM UTILIZING FLUID LOGIC DEVICE

Filed Aug. 10, 1967

Sept. 1, 1970 D. J. THOMSON 3,526,723

SWITCHING SYSTEM UTILIZING FLUID LOGIC DEVICE

Filed Aug. 10, 1967 7 Sheets-Sheet 6

3,526,723

SWITCHING SYSTEM UTILIZING FLUID LOGIC DEVICE

David J. Thomson, Summit, N.J., assignor to Bell Telephone Laboratories, Incorporated, Murray Hill and Berkeley Heights, N.J., a corporation of New York Filed Aug. 10, 1967, Ser. No. 659,794
Int. Cl. H04q *1/00;* H04m *3/00*
U.S. Cl. 179—18 4 Claims

ABSTRACT OF THE DISCLOSURE

A switching system for connecting predetermined ones of incoming telephone circuits to predetermined ones of outgoing telephone circuits utilizes fluid logic devices to obtain compact low resistance switching arrays. Electrical signals are converted to fluid pressure signals by electrostatically deflecting a fluid jet thereby creating pressure pulses or fluid signals at output ports which initiate low resistance connections at appropriate cross-points in the switching matrix.

CROSS REFERENCES TO RELATED APPLICATIONS

This invention is related to that disclosed in the applications of H. Winter, Ser. No. 659,686, filed Aug. 10, 1967 and L. G. Anderson Ser. No. 659,698, filed Aug. 10, 1967 both being filed concurrently herewith and both being assigned to the same assignee as this invention.

BACKGROUND OF THE INVENTION

This invention relates to switching systems utilizing fluid logic. Specifically, fluid logic devices are used for transducing electrical logic information into fluid logic information, particularly for fluidically actuating the connections at the crosspoints of arrays, or so-called switch blocks, that, in stages, selectively connect telephone subscribers to trunk lines in telephone switching system.

Telephone central office switching systems have in the past utilized electromagnets both for establishing connections and furnishing the control signals or logic by which the connections are selected. Such systems are slow and bulky. In more recently developed systems, electronically developed control signals selectively energize particular electromagnets to close comparatively small relay contacts, so-called ferreeds. The ferreeds interconnect the seletced coordinate crosspoints on mutually-parallel incoming coordinate conductors which form arrays with transverse outgoing coordinate conductors. Successive arrays, or switchblocks of this type, all responding to electronically developed control signals, then selectively connect an incoming call to an outgoing trunk. However, the so-called ferreeds introduce manufacturing problems and must be protected in bulky envelopes.

In order to use the electronic control signals most directly, consideration has been given to connecting the crosspoints with semiconductor switches. However, no matter how effective these switches, each of them introduces an undesirable impedance at the crosspoints. Thus, if the number of arrays, and hence the number of crosspoints through which an incoming siganl must pass from one telephone subscriber to another is great, considerable distortion and loss of signal is experienced.

The beforementioned copending application of H. Winter being concurrently filed herewith and assigned to the same assignee of this application, eliminates many of these difficulties by fluidically actuating mercury balls that establish contact between the coordinate conductors or crosswires in arrays at the crosspoints without introducing additional resistances. The low-resistance contact affordable by such mercury balls between two metallic coordinate conductors is eminently suitable for such work. Moreoover, the speed with which the fluid can actuate such mercury balls is more than adequate. However, the operation of such arrays still depends upon electrically actuating the fluid which moves the ball contacts, with the usual electrical control signals. In the past, reasonably fast conversions from electrical pulses to fluid pulses have been difficult to obtain. Available solenoid-actuated fluid pulsers have been found far too bulky and expensive to use in large numbers as electric-to-pressure transducers, especially when compared with compact fluid-actuated switching arrays described in the beforementioned application of H. Winter.

SUMMARY OF THE INVENTION

According to a feature of the invention these deficiencies of fluid-actuated switching systems are eliminated by applying the electric control or input signals to create respective electrostatic fields across gas flows establised in a respective chamber so as to deflect the flow toward one of two outlet ports, and by comparing the pressures at the outlet ports so as to achieve a fluid pulse comparable to the electrical input pulse. Preferably, the differences in pressure appearing at the outlet port actuate a fluid fli-flop. According to another feature of the invention a fluid differential amplifier achieves the comparison of pressures at the outlet ports for the purpose of actuating the flip-flop.

According to still another feature of the invention the electrostatic field acting upon the fluid flow is achieved by mounting the deflection plates adjacent the chamber and connecting these to the electrical pulse input. The plates create an electrical field which deflects the dielectric fluid.

According to yet another feature of the invention the chamber in which deflection occurs is formed by cutting and punching suitable openings in one of three layers, applying the electrodes to the layer, and laminating the three layers together after forming suitable flow paths in the other layers.

According to still another feature of the invention, arrays of such chambers and electrodes are punched and formed before being laminated to form an array of transducers. Preferably, additional layers laminated thereto form the comparison means such as the amplifier and flip-flop for each transducer.

These and other features of the invention are pointed out in the claims. Other objects and advantages of the invention will become better understood from the following description when read in light of the accompanying drawings:

DESCRIPTION OF THE PREFERRED EMBODIMENT

Figure 1:
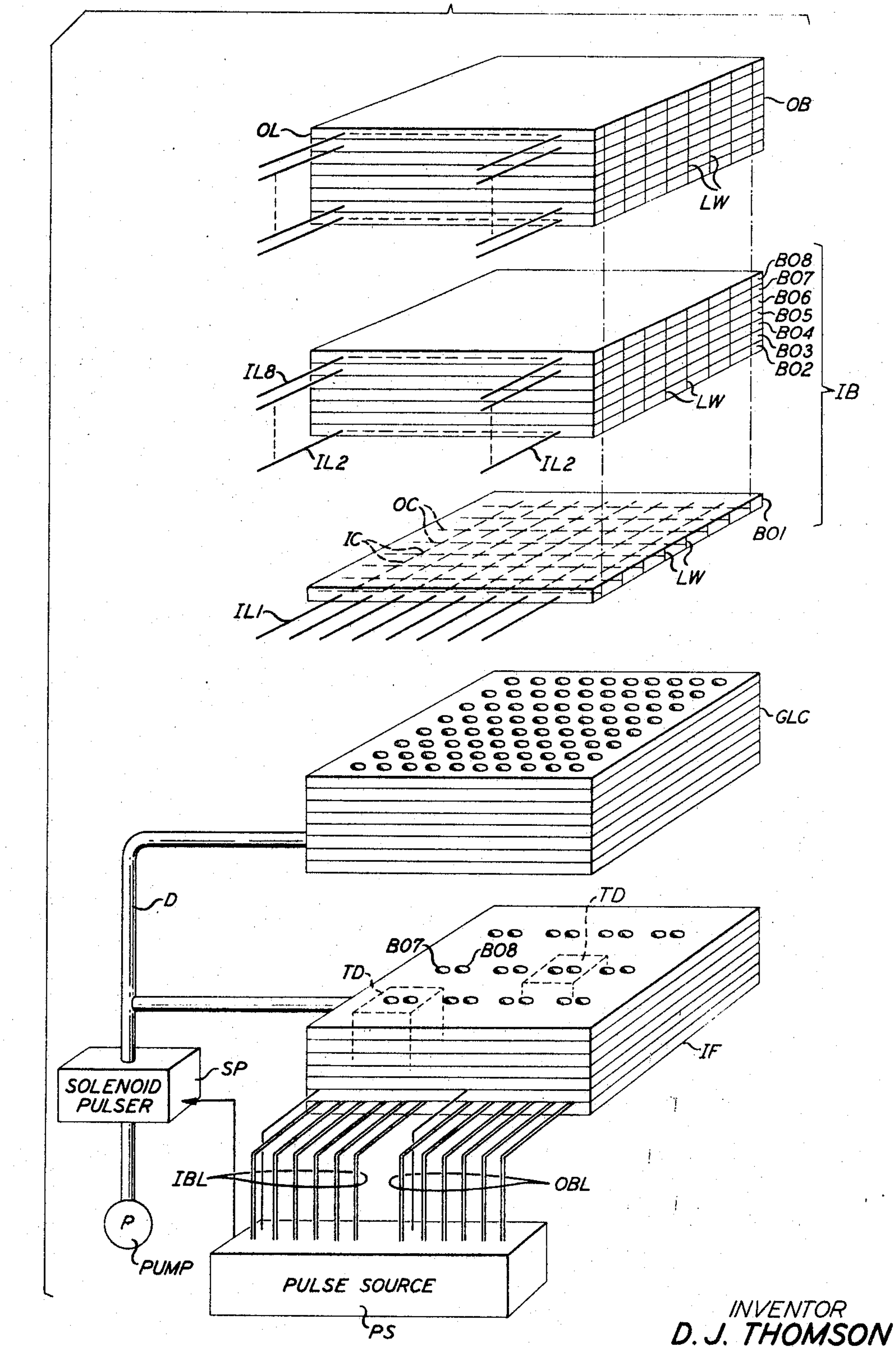
FIG. 1 is an exploded perspective block diagram, partially in schematic form, of a telephone switching grid suitable for use in a telephone central office switching network and embodying features of the invention.
Figure 2:
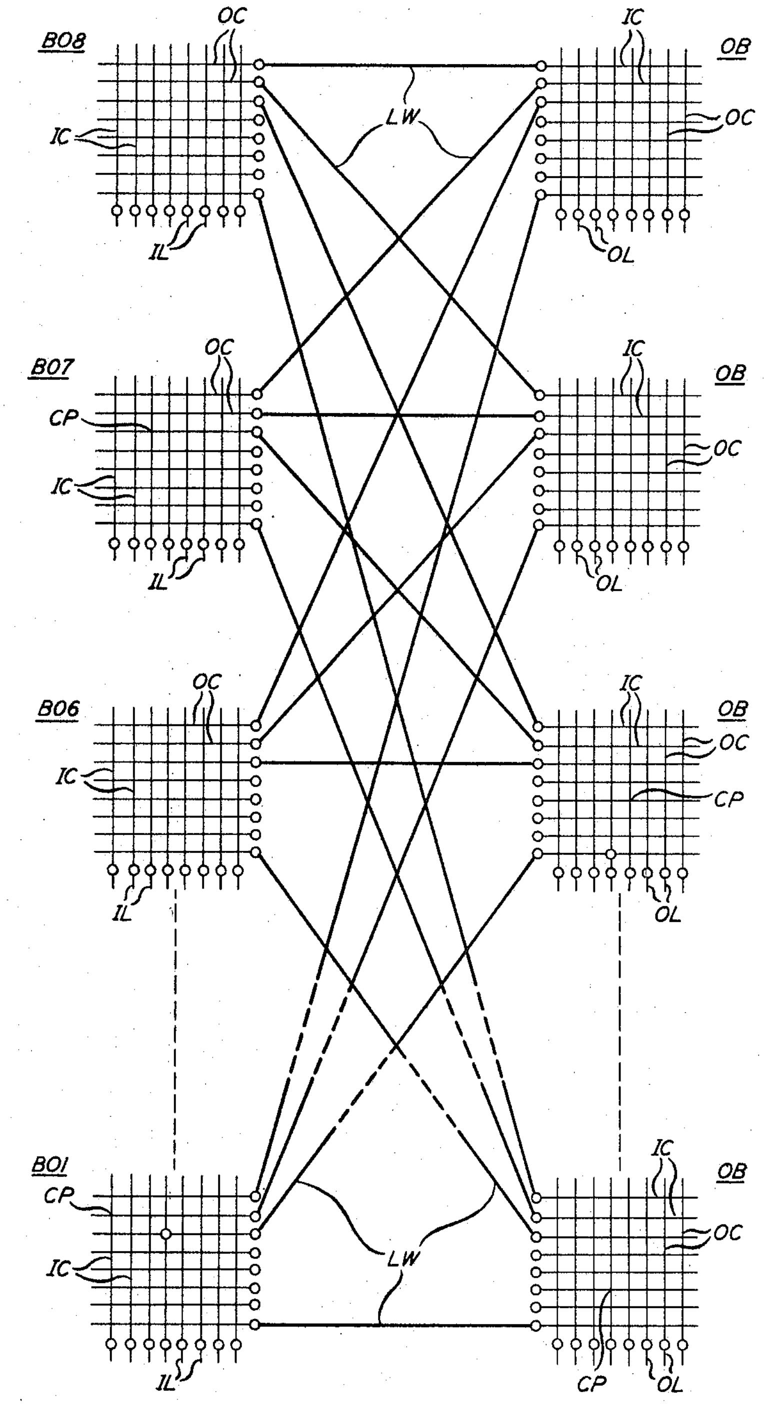
FIG. 2 is a schematic diagram of the input and output switches forming the portion of the grid in FIG. 1.

In the telephone switching system of FIGS. 1 and 2 eight input lines IL1 arrive from individual telephone circuits. They terminate in eight parallel input coordinate conductors or coordinates IC printed, plated, or vapor-deposited under the upper surface of an array board BO1. Together with seven similar boards BO2 to BO8 at the ends of lines IL2 to IL8, the board BO1 forms a coordinate input block IB in a switching system such as described in the beforementioned copending application of H. Winter, filed concurrently herewith. The lines IL1 to IL8 and boards BO1 to BO8 are referred to generally as lines IL and boards BO. Eight lines IL terminate in input coordinates IC in each of the eight boards BO. This furnishes a total of sixty-four input lines IL. On each of the eight boards BO eight output coordinate conductors or coordinates OC above the bottom of the board BO and not contacting the input coordinates IC terminate in link wiring LW. The latter connects the output coordinates OC which are transverse to the input coordinates to input coordinates on an eight-board output block OB.

The output block OB is constructed similar to the input block IB. It ends in sixty-four output lines OL coming from suitable output coordinates OC in the output block OB. On each board BO of the output block OB and input block IB mercury switches actuated pneumatically as disclosed in the copending Winter application appear at each crosspoint CP of the input coordinates IC and output coordinates OC in the input block IB and output block OB. The switches at the crosspoints CP are energized by transducer devices TD in an input interface IF, through an intermediate gas-logic circuit GLC. The latter is pressurized by pump P through a duct D. The duct D also forms a pressure path to an input interface IF that includes the transducer devices TD. The interface operates between the gas-logic circuit GLC and input binary lines IBL from an electric computing pulse source PS. The latter generates control signals. By way of the pulsed lines IBL it actuates six transducer devices TD to select which crosspoint on which board is to be closed in the input block IB. By way of the output binary lines OBL the source PS actuates six other transducers TD in the interface IF and thereby selects on a binary basis which crosspoint on which board OB is to be switched in the block OB. The gas logic circuit actuates the switches at the crosspoints on the basis of the selections of the pulse source PS. To conserve energy a solenoid pulser SP in the duct D responds to the pulse source PS to apply gas only when needed. However gas may be supplied continuously.

FIG. 2 illustrates that the selection of one crosspoint CP in the input block IB and one crosspoint CP in the output block OB uniquely connects one input line IL to one output line OL. For example, closing the switch at the crosspoint marked with a circle, at the bottom left of FIG. 2, and closing the crosspoint in the middle right of FIG. 2 shown by a circle, connects one particular input line to one selected output line OL. On a binary basis, three pairs of the input binary lines IBL of the input address select the board BO of block IB on which the crosspoint is to be closed and the other three input binary lines IBL select which input coordinate IC the switch to be closed on the selected board will affect. Of the output binary lines OBL three pairs of lines select a board on the output block OB. Simultaneously, these selections select an output coordinate OC in the board BO on the input block IB as well as an input crossbar on the selected board of the output block. The remaining three pairs of output binary lines select the desired output line. This selection process corresponds to that common for connecting similar array switches magnetically. For example, the so-called No. 5 crossbar system for telephone lines operates on this principle.

In FIGS. 1 and 2 the switches at crosspoints CP constitute mercury balls encapsulated in suitable chambers each located so that an input coordinate IC and one output coordinate OC passes through the chambers at each crossover point. The chambers and the mercury balls are arranged so that gas flowing through suitable ports to the chambers pneumatically move the mercury balls into or out of contact with each of the crossbars in the input blocks and output blocks. By virtue of the immediate contact between the crossbars through the mercury balls, low ohmic connections are established between the desired input and output lines. Such pneumatic switching systems may be manufactured cheaply by batch-processing and are extremely reliable. The workmanship and labor required to accomplish this is much less than that required for comparable magnetic or electromagnetic switching systems.

Figure 3:
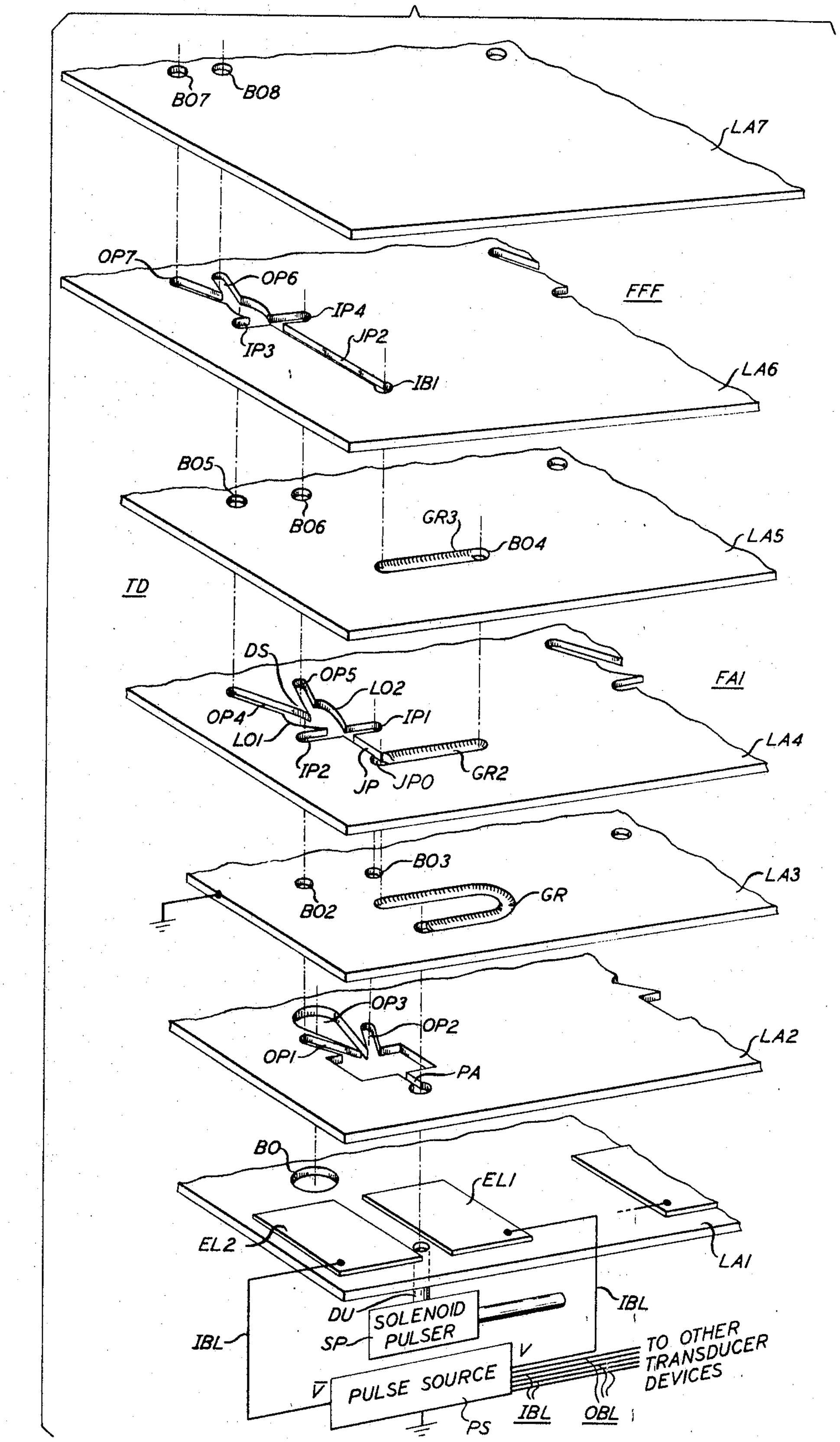
FIG. 3 is a partial schematic detail, in exploded perspective form, of the interface of FIG. 1, showing one of the interface's transducers which embodies features of the invention.

To utilize the advantages of the pneumatic switching system, the electrical input signals are transduced into suitable pneumatic signals by constructing the interface IF as shown in detail in FIG. 3. FIG. 3 illustrates one corner of the interface IF in detail and shows the details of one transducer device TD. The remaining transducers TD correspond to the transducer shown although it will be obvious that variations are possible.

In FIG. 3, seven layers LA1, LA2, LA3, LA4, LA5, LA6 and LA7 are laminated together. The solenoid pulser SP introduces a pulse of air flow through a duct DU to a horizontal nozzle or path PA in the layer LA2. Passage of fluid through the path PA produces a slightly diverging gas jet which arrives in three output ports OP1, OP2 and OP3 with a Gaussian pressure distribution. The ports OP1 and OP2 are arranged to receive the respective sides of the Gaussian distribution.

In the electric pulse source PS, voltages appearing at opposing collectors of respective bistable multivibrators or flip-flops form complementary outputs at a pair of lines IBL or OBL. The output across one line and ground is a logic signal V and the output across the other line of the pair and ground is an inverse logic pulse signal $\overline{V}$.

The solenoid pulser SP serves mainly to conserve energy. It can do this when the switching actions at the crosspoints CP are bistable. In that case it emits pneumatic pulses coincident with the electric pulses. It drops out after the connections CP are established. If necessary to maintain the connections it may furnish gas pressure continuously.

Each electrical pulse input at the lines IBL forms an electrostatic field between one of two electrodes EL1 and EL2 and a grounded metal plate which forms the layer LA3. The electrodes EL1 and EL2 are shown in FIG. 3 as deposited upon the insulating layer LA1. However, the invention contemplates forming the layer LA1 from a conductive plate separated along the travel path of the gas jet with the dielectric. The electric field slightly deflects the moving gas toward one or the other side depending upon the electric field. This of course requires the solenoid pulser to be injecting gas while the electrical input pulse occurs. The deflection shifts the Gaussian distribution so that one or the other ports OP1 or OP2 is subjected to more pressure than the other. The remaining gas flows out through an exhaust or output port OP3 and an opening bore B0 in the layer LA1.

A pair of bores BO2 and BO3 in the layer LA3 pass the pressure differential appearing at the output ports OP1 and OP2 to input ports IP1 and IP2 in a fluid pressure differential amplifier FA1. At the same time an extended groove GR in the top of layer LA3 passes some of the gas flow from the duct DU with some delay to a jet forming nozzle or path JP in the layer LA4. The undisturbed gas jet emerging from the path JP divides evenly between output ports OP4 and OP5. When a pressure differential exists in the input ports IP1 and IP2 as a result of jet deflection by the electric field formed by the electrodes EL1 and EL2, the jet is deflected toward either the output path OP4 or OP5. This deflection is greater than heretofore available from the deflection induced by the electrodes. A resulting pressure differential appears at the output ports OP4 and OP5. The groove GR constitutes a delay which assures that a jet appears between the input ports IP1 and IP2 at the time the pressure differential there exists.

A second groove GR2 communicating with the bore JP0 delays the gas pulse from the solenoid pulser while transmitting it through a bore BO4 and a delay groove GR3 to the input bore IB1 of a jet forming path JP2 cut in the layer LA6. Simultaneously, pressure differentials existing at the output ports OP4 and OP5 pass through the bores BO5 and BO6 to the input ports IP3 and IP4 of a fluid flip-flop FFF. This pressure differential, if greater in the left-hand port IP3, deflects the jet produced by the path JP2 to the right so that virtually all the gas flow passes out of the output port OP6 rather than the output port OP7 in the flip-flop. A greater pressure at the input port IP4 deflects the jet to the left and produces a gas output pulse a output port OP7. These pressure outputs appear at bores BO7 and BO8 communicating with the output ports OP7 and OP6. The output at the bore BO7 constitutes the reverse logic output and the output at the bore BO8 constitutes the logic output. The choice of either of these bores for this function is, of course, arbitrary and depends upon which of the electrodes EL1 or EL2 receive the logic signals from the electrical source.

Figure 4:
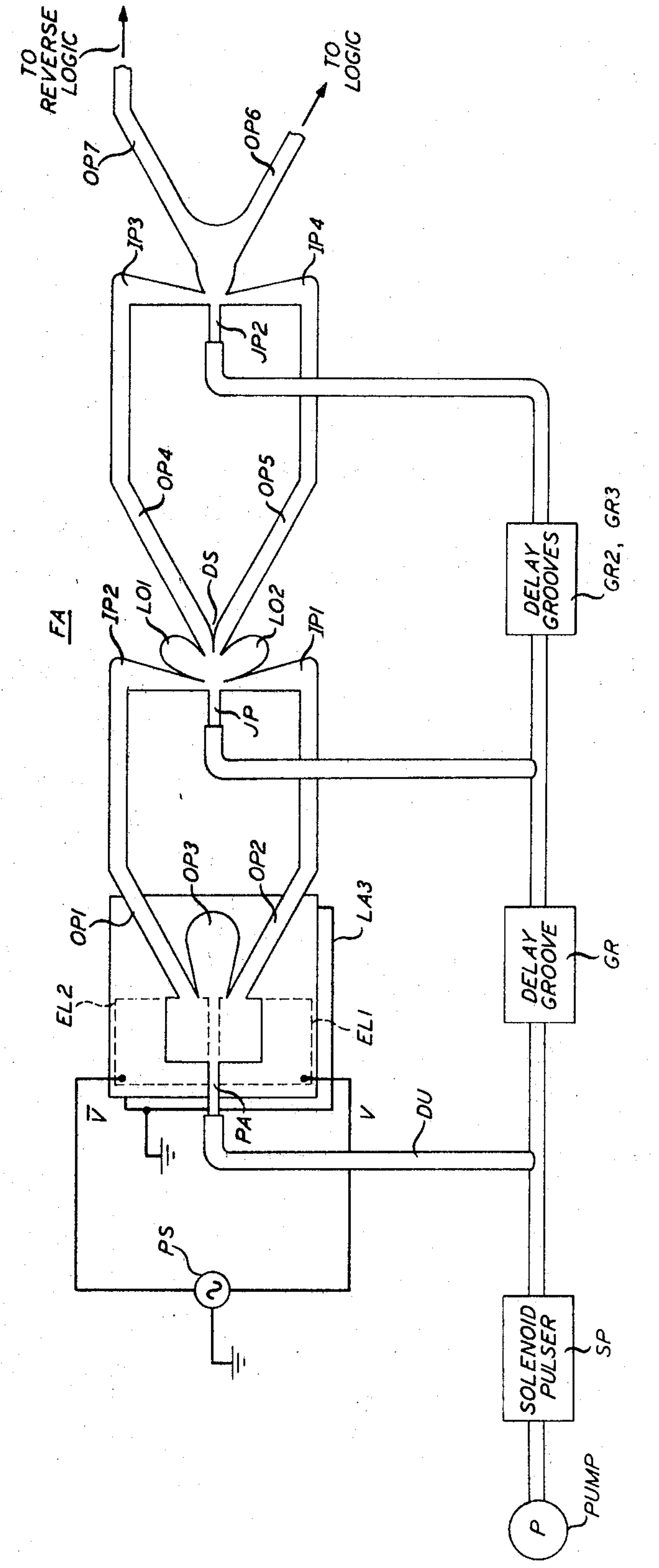
FIG. 4 is a schematic flow diagram illustrating the operation of one transducing device in the system in FIG. 3.

The operation of the transducer device TD of FIG. 3 can also be appreciated from consideration of the schematic diagram in FIG. 4. Here, the solenoid pulser SP applies a pulse from the pump P through a duct DU to the nozzle or path PA. The latter forms a jet which in the absence of an electrical signal flows out through the output port OP3. Only small portions of the gas flow appear in the output ports OP1 and OP2. The flows here are substantially equal. When the pulse source PS applies a signal across one of the electrodes EL1 or EL2 and the grounded layer LA3 the dielectric gas stream is electrostatically deflected toward one side. While a considerable portion of the gas stream still flows through the output port OP3, a much larger portion flows through the port OP2 and virtually none through the port OP1. This shift in gas flows between the ports OP1 and OP2 may be reversed depending upon the polarity of the input pulse or the electrode to which it is applied. The shift in flows introduces a transverse gas flow in the input port IP1 with little gas flow in the input port IP2. The delay groove GR transmits gas flow from the entrance to the duct DU to the jet-forming path JP in the fluid amplifier FA. The delay here is equal in the grooves GR to that introduced by flow through the input paths IP1 and IP2. The jet formed by the path JP flows between a pair of lobes LO1 and LO2 in the chamber across a dividing strip DS between the output paths OP4 and OP5. When the pressure in the input port IP1 is greater than the pressure in input port IP2, the jet from the port JP is deflected to the left and out of output port OP4.

With some delay this flow appears at the input port IP3. The lesser flow in the output port OP5 appears in the input port IP4. Delay grooves GR2 and GR3 direct the flow of fluid from the pulser SP through the path JP2 to form still another jet. The latter is subjected to the transverse flows introduced by the differential occurring in the input ports IP3 and IP4. A greater pressure in the port IP3 deflects the jet to the right and out of the output port OP6. Reversing application of potential to the electrodes EL1 and EL2 may produce this output at the port OP7. The output at the port OP6 constitutes the logic output and that of OP7 the reverse logic output.

The transducer device TD in FIGS. 3 and 4 constitutes one of twelve transducer devices TD of the interface IF in FIGS. 1 and 3. The interface IF with the transducer device TD may be manufactured with batch manufacturing techniques into the assembly depicted schematically in FIGS. 1 and 3 wherein the thicknesses of the seven layers are exaggerated for clarity. In each case, each of the layers LA1 to LA7 are punched and grooved at as many locations as there are transducer devices in FIG. 1 with the configurations as shown in FIGS. 3 and 4. The layer LA1 is further coated as necessary at each location for the transducer device with suitable electrodes EL1 and EL2. A single solenoid pulser adequately applies pulses of gas through suitable ducts DU or through additional passages established with extra bottom layers. The duct DU or passages are essential for each transducer device TD. Electrodes EL1 and EL2 may be vapor-deposited or may be deposited as foils with suitable adhesives. Other adhesives then laminate the layers into the block shown in FIG. 1. The layers are arranged so that each of the bores BO7 and BO8, BO5 and BO6 as well as all the other chambers register precisely with the ports OP6, OP7, OP4 and OP5. The interface IF is then ready for operation in FIG. 1.

Figure 5:
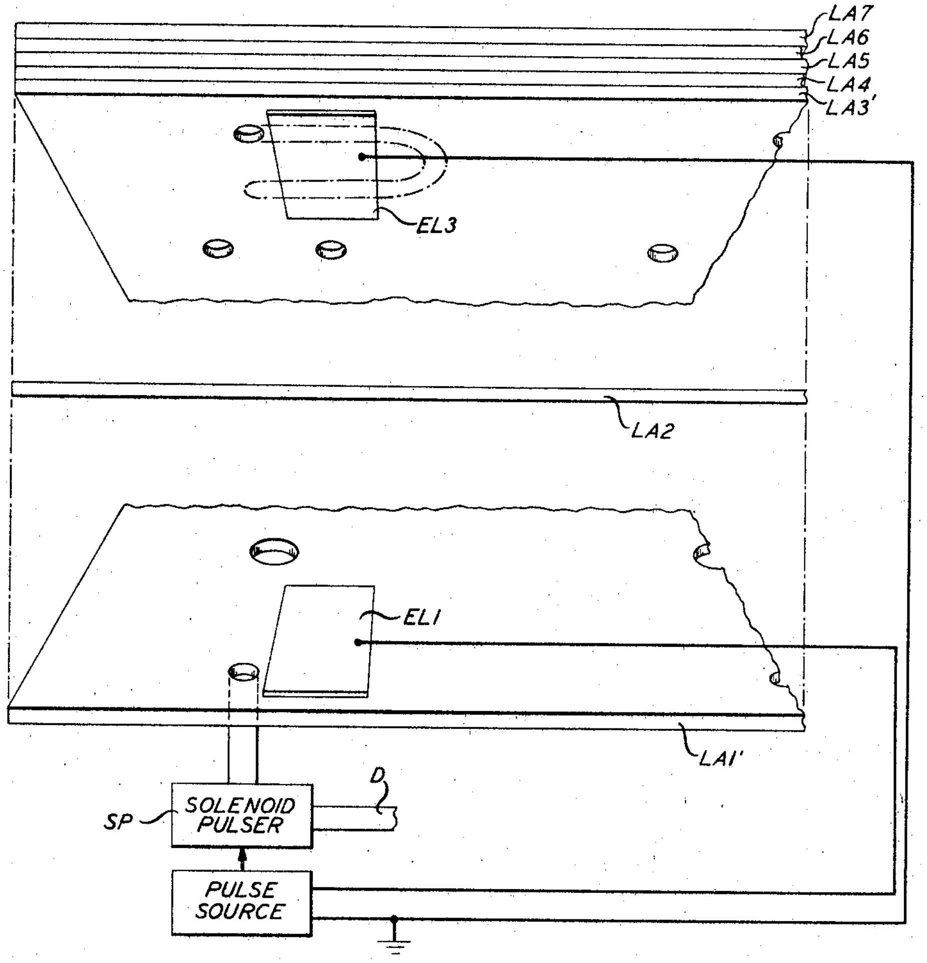
FIGS. 5 and 6 are partially schematic details of other interfaces embodying features of the invention, suitable for use in FIG. 1, and showing other transducer devices also embodying features of the invention.

According to the invention the interface IF may also have the structure of FIG. 5 wherein a single transducer device is again shown in detail. Here, the layers LA2 and LA4 through LA7 correspond to the similarly-identified layers shown in FIG. 3. However, here layers LA1′ and LA3′ are substituted for layers LA1 and LA3. Layer LA1′ differs from layer LA1 in having only the one electrode EL1 deposited thereon. Layer LA3′ differs from the layer LA3 in being composed of insulating material having deposited thereon an electrode EL3 opposite that of electrode EL1. With this arrangement only the electrical logic signals V are applied across electrodes EL1 and EL3. The inverse logic signals from the electrical source or pulse source PS are eliminated. In FIG. 5 an electrical signal in pulse form across electrodes EL1 and EL3 deflects the gas jet toward the port OP2. The somewhat diverging jet is also directed slightly toward the port OP1 so that the pressure at the port OP1 is larger than at the port OP2 when no electrical signal is applied. Thus, while the pulser emits gas an output appears at the inverse logic bore BO7 even when no electrical pulse V is applied to the electrodes. However, no signal appears in the absence of both electric and gas pulses. The device TD in FIG. 5 is one of many such devices formed from the layers LA1 to LA7 and operates substantially the same in other aspects as the device in FIG. 3. Thus, according to this embodiment of the invention, the transducer device of FIG. 5 constitutes one of the many transducers appearing in the interface IF of FIG. 1.

Figure 6:
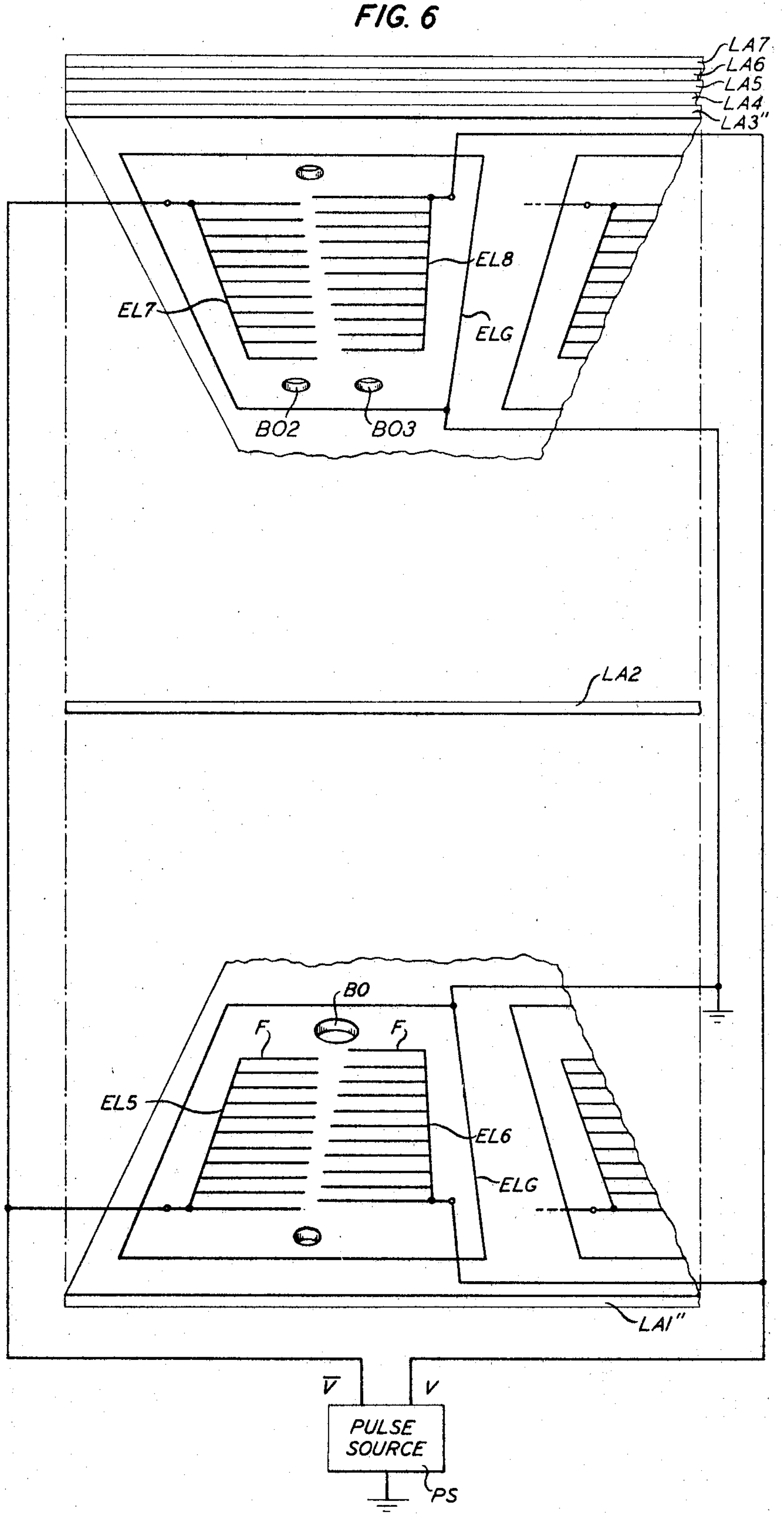
Figure 7:
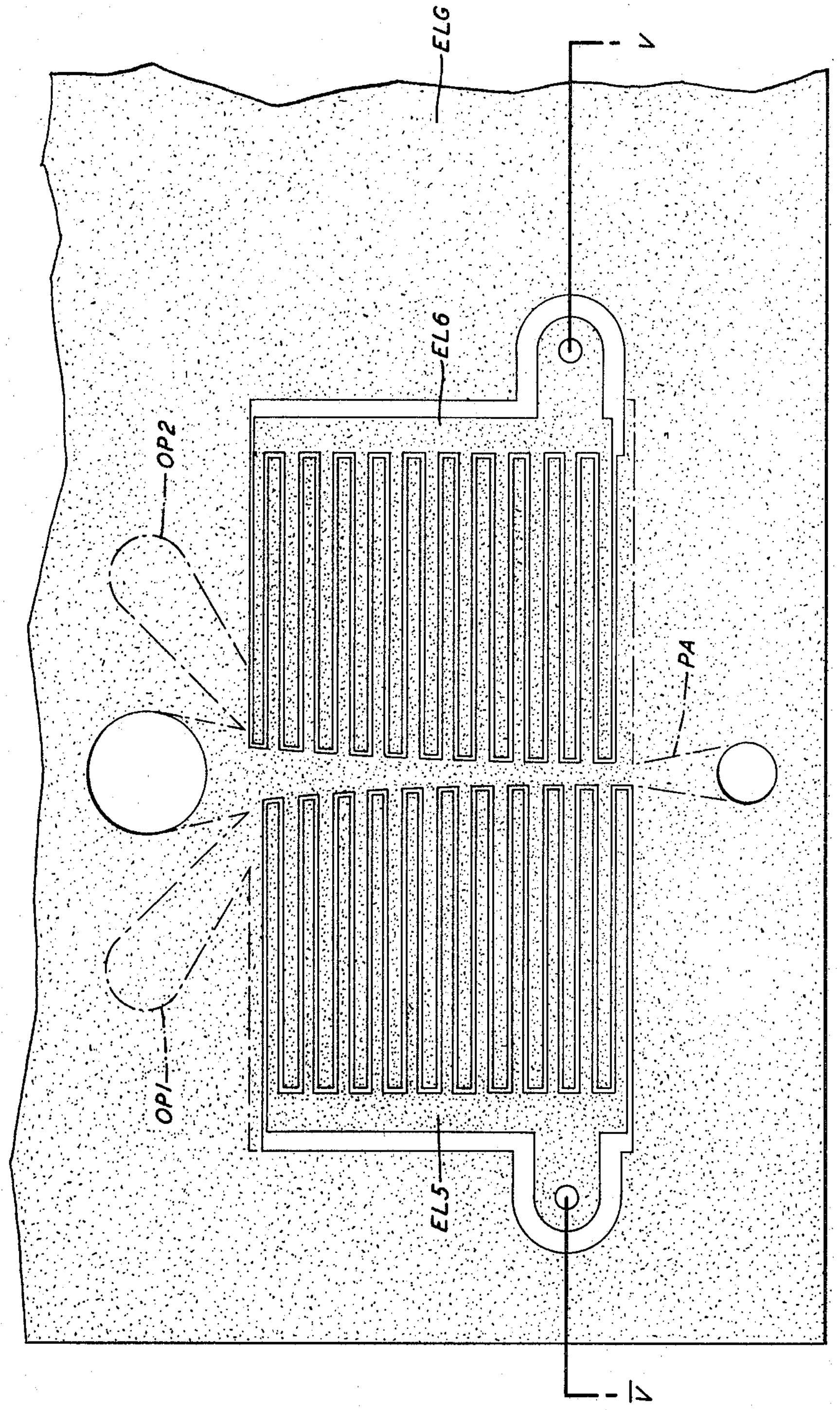
FIG. 7 is a detail of one layer in the interface of FIG. 7.

A further example of a transducer TD in the interface IF of FIG. 1 embodying features of the invention appears in FIG. 6 showing one of these transducers as part of the interface IF. This transducer device TD also corresponds to that of FIG. 3. However, here, the layers LA1″ and LA3″ again differ from their corresponding layers LA1 and LA3 in FIG. 3. The layer LA1 possesses two vapor, or otherwise, deposited finger-like electrodes EL5 and EL6. The latter appear in more detail in FIG. 7. The fingers F of the electrode EL5 extend toward the path of the jet and are juxtaposed opposite the interdigital spaces between the fingers F of the electrode EL6. At the same time a similarly deposited ground electrode ELG extends around both electrodes EL5 and EL6 and between all the fingers but without touching the fingers. The ends of the fingers form cubic curves aligned with the path of the jet from the path PA toward the ports. For clarity the positions of the ports and path PA are shown in FIG. 7 by dot-dash lines. The alignment of the nozzle or path PA is such as to direct the jet in the absence of an elctrical signal enough toward OP1 to furnish an inverse logic signal. The invention also contemplates directing the jet centrally toward the bore BO1 with substantially even portions entering the bores BO2 and BO3. However, in that case, apparatus relies upon an inverse logic signal V to obtain a continuous inverse logic output at the bores BO7 in the absence of a normal electrical logic signal.

The layer LA3 possesses electrodes EL7 and EL8 which are symmetrically identical to the electrodes EL6 and EL5 when taken about a linear axis of symmetry perpendicular to FIG. 7. That is to say, the electrodes EL7 and EL8 represent the arrangement of electrodes EL5 and EL6 when the layer LA1″ is turned upside down. Moreover, the electrode EL7 and EL8 are arranged directly above the electrodes EL5 and EL6. In this arrangement the fingers of electrodes EL7 and EL8 lie over the interdigital spaces of electrodes EL5 and EL6, respectively. The ground electrode EL6 again surrounds the electrodes EL7 and EL8 and all the fingers of both electrodes but without touching them.

The electrodes EL6 and EL8 each receive the input logic signal from the electrical source or pulse source PS. At the same time, the electrodes EL5 and EL7 receive the inverse logic signal $\overline{V}$. The inverse logic signal $\overline{V}$ supplies a substantially grounded signal to the electrodes EL5 and EL7 and a normal information signal V to electrodes EL6 and EL8. The information signal produces a slightly varying electrical field intensity; i.e., high gradient in field strength, between the fingers of electrodes EL6 and EL8 and the adjacent grounded conductors of electrode ELG. This is significant because the gas pressure differential between the electrodes to the right side of the gas jet and the left side of the gas jet from the path PA varies with the square of the field strength as well as the square of the field strength gradient. Thus, by increasing the field strength gradient the electrodes EL5, EL6, EL7 and EL8 increase the total pressure differential on opposite sides of the jet. This draws the jet to the volume between the electrodes EL6 and EL8 when a logic signal V is applied there and produces a higher gas flow in port OP2 than in port OP1. A similar deflection occurs when the inverse signal $\overline{V}$ from the pulse source is applied to the electrodes EL5 and EL7. In that case, the pressure is increased in port OP1. The resulting fluid signals are amplified and operate a flip-flop as shown in FIG. 3.

Figure 8:
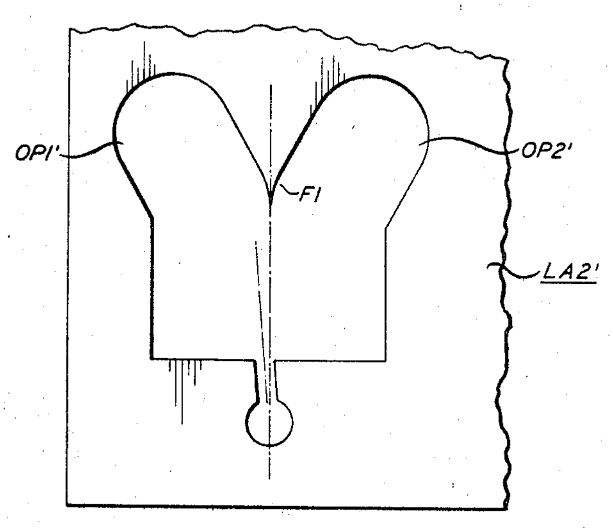
FIG. 8 is an alternate arrangement for one of the layers in FIGS. 3, 5 and 6.

The layer LA2 of FIGS. 3, 5, and 6 may also have the shape shown in FIG. 8. In this case, the Gaussian distribution of gas pressure from the path PA is shifted toward the port OP1 by a slight shift in the direction of the path PA. The operation of devices using this layer differs from that of FIGS. 3, 5 and 6 in that the pressure differential at ports OP1 and OP2 instead of being formed by gas flows that correspond to the side slopes on the Gaussian function are formed with the entire side slopes and peak. The gas directed at the port OP1 may be considered as including the peak of the function. In this case, the pressures which obtain when the jet, or just before the jet, is deflected to one or the other port may impede deflection to the other port. Thus, a larger voltage may have to be placed on the electrodes than with ports arranged as in the layer LA2. In the layer LA2′ a fin FI separates the bores BO2 and BO3.

The theory upon which operation of this invention is predicated, depends upon the ability of a curved electrical field to apply a force to a dielectric such as air. The further the curvature of the field, the greater the force applied. In the embodiment of FIG. 6, the field curvatures are accentuated and thereby require less voltage or electrical energy to achieve the same force. Conversely, the same voltage energy when applied to FIG. 7 as applied to FIG. 3 or the apparatus of FIG. 3 achieves a much greater deflection.

The layers LA1 to LA5 alone, when using the layers LA2 as illustrated in FIG. 3, serve as an analog device because the ports OP1 and OP2 sense only small portions of the side slopes on the Gaussian function representing the gas flow in the jet from the path PA. Since these slopes are substantially idetnical and because they are largely subtractive when applied to the differential amplifier, the effect is similar to the electronic effect of a frequency modulated discriminator circuit whose output constitutes an S curve. Hence, as the signal deflection remains within limited bounds, a linear output may be expected. When using the layer LA2′ of FIG. 8, the peak of the Gaussian curve is also included in the sensors represented by the ports OP1′ and OP2′, so that this linearity no longer obtains.

The invention may also be embodied by biasing the path PA of layer LA2 in FIG. 3 slightly to one side so as to achieve a constant inverse logic output even in the absence of an input pulse.

The illustrated embodiments of the invention show the interface to be used with nine transducer devices TD. However, larger matrices are possible. Moreover, the layers may be manufactured in huge sheets having thousands of matrices and then cut as necessary. As a result, extremely simple manufacturing operations furnish multiplicity of shaping elements for transducers for gas logic. This is possible because there exist considerable tolerances in the size and location of the ports.

The invention affords a simple, easily manufacturable transducer system for controlling switching blocks in telephone systems.

While embodiments of the invention have been described in detail, it will be obvious to those skilled in the art that the inveniton may be embodied otherwise without departing from its spirit and scope.

What is claimed is:

1. A telephone switching system comprising communication input lines and output lines, electrical input means responding to dialing information for applying switching logic, insulating means defining a plurality of chambers and two ports for each chamber, said insulating means defining for each chamber a fluid flow nozzle, pump means for directing fluid under pressure through the nozzles and the chambers in divering fluid jets toward said ports, electrode means at each of the chambers responsive to the electrical input for applying a jet-deflecting electric field along the diverging jets so as to vary the relatively proportions of the jet directed at the respective ones of said ports, and fluid control means responding to fluid pressures at said ports, fluid switching means rsponding to said fluid control means and connected electrically to said input lines and output lines for pneumatically connecting predetermined ones of said input lines to predetermined ones of said output lines on the basis of the switching logic.

2. A telephone switching system comprising in combination communication input lines and output lines, fluid logic devices, each of said devices having a chamber, said chamber having a plurality of output ports, means for injecting a jet of fluid into said chamber, means for deflecting said jet of fluid toward a predetermined one of said ports in response to dialing information on said input lines thereby to create fluid pressure signals at said ports, and fluid switching means responsive to said fluid pressure signals for connecting predetermined ones of said input lines to predetermined ones of said output lines on the basis fo said dialing information.

3. Apparatus in accordance with claim 2 wherein said deflecting means comprises a pulse source for generating control pulses in response to said dialing information and electrode means for applying a fluid deflecting electric field along said jet in response to said control signals.

4. Apparatus in accordance with claim 3 wherein said fluid logic devices include amplifier means for amplifying said fluid pressure signals.

References Cited

UNITED STATES PATENTS 3,071,154 1/1963 Cargill et al. ---------- 137—608

KATHLEEN H. CLAFFY, Primary Examiner

W. A. HELVESTINE, Assistant Examiner

U.S. Cl. X.R.

137—81.5; 340—166